United States Patent [19]

Inada et al.

[11] Patent Number: 5,183,288
[45] Date of Patent: Feb. 2, 1993

[54] AIR BAG DEVICE FOR AUTOMOBILE

[75] Inventors: Haruhiro Inada, Hiroshima; Hisao Muramoto, Yamaguchi, both of Japan

[73] Assignee: Mazda Motor Corporation, Hiroshima, Japan

[21] Appl. No.: 675,622

[22] Filed: Mar. 27, 1991

[30] Foreign Application Priority Data

Mar. 28, 1990 [JP] Japan .................... 2-81732

[51] Int. Cl.⁵ ............................................ B60R 21/16
[52] U.S. Cl. ................................... 280/732; 280/728
[58] Field of Search ............... 280/730, 732, 743, 728, 280/731

[56] References Cited

U.S. PATENT DOCUMENTS

| | | | |
|---|---|---|---|
| 3,632,136 | 1/1972 | Foltz | 280/732 |
| 3,756,617 | 9/1973 | Brown | 280/732 |
| 4,842,299 | 6/1989 | Okamura et al. | 280/743 X |
| 4,878,689 | 11/1989 | Mitzkus et al. | 280/743 X |
| 4,895,389 | 1/1990 | Pack, Jr. | 280/732 |
| 4,925,209 | 5/1990 | Sakurai | 280/732 X |
| 5,060,971 | 10/1991 | Nanbu et al. | 280/743 X |
| 5,062,663 | 11/1991 | Satoh | 280/743 |
| 5,069,477 | 12/1991 | Shiraki | 280/743 X |

FOREIGN PATENT DOCUMENTS

| | | | |
|---|---|---|---|
| 0415362 | 3/1991 | European Pat. Off. | 280/743 |
| 3904977 | 1/1990 | Fed. Rep. of Germany | 280/743 |
| 63-258240 | 10/1988 | Japan . | |

*Primary Examiner*—Charles A. Marmor
*Assistant Examiner*—Tamara L. Graysay
*Attorney, Agent, or Firm*—Keck, Mahin & Cate

[57] ABSTRACT

An automobile air bag device has an air bag disposed inside an instrument panel structure, having an opening through which the air bag, while inflating, projects out of the instrument panel structure when the automotive vehicle is subjected to a collision. The opening is closed, thereby covering the air bag, by a two-part air bag lid, mounted on the vehicle, which includes upper and lower lids. A connecting member, formed with a breakable line, is attached to a back of the two-part air bag lid so as to join the upper and lower lids into a single two-part lid. The connecting member is broken and separated, by inflation of the air bag, into two parts, so as to allow the upper and lower lids to open upwards and downwards, respectively. The air bag is thereby allowed to unfold and project out of the instrument panel structure.

9 Claims, 2 Drawing Sheets

AIR BAG DEVICE FOR AUTOMOBILE

BACKGROUND OF THE INVENTION

1. Field of the Invention

The present invention relates to an air bag device for an automotive vehicle. To protect an occupant of a passenger seat in a front passenger compartment during a collision of an automotive vehicle, an air bag device may be installed in a space inside an instrument panel structure, through an opening of the instrument panel structure located in a position in front of the passenger seat. Such an air bag device typically has an air bag which is inflated and unfolds toward the passenger seat of the automotive vehicle through the opening of the instrument panel structure so as to restrain and protect the occupant sitting on the passenger seat upon the occurrence of a collision.

The opening of the instrument panel structure is typically closed off by an air bag lid from the front passenger compartment, so as to cover and protect the air bag device from damage. When a collision occurs, the air bag lid is opened towards the front passenger compartment by the inflating air bag, allowing the air bag to unfold.

2. Description of Related Art

The structure of such an air bag lid may be either an integral type of structure, in which an integral lid opens upwards or downwards about either a lower or an upper end about a hinge when the air bag unfolds, or a two-part or double-leafed hinged type of structure, such as is described in, for example, Japanese Unexamined Patent Publication No. 63-258240. Such a double-leafed hinged lid includes an upper lid capable of opening upwards, and a lower lid, capable of opening downwards. Because the air bag lids project into the passenger compartment, on opening, only a small distance and, accordingly, the degree of design freedom of the instrument panel structure is high, the double-leafed hinged type of air bag lid has been widely adopted.

Two kinds of structures for such double-leafed hinged air bag lids are well known. One well known type of double-leafed hinged air bag lid has an upper lid portion and a lower lid portion which are, initially, made as a single part formed with a weakened breakable line. When the air bag unfolds, the air bag lid is broken along the weakened breakable line so as to open upward and downward in two parts and uncover the opening in the instrument panel structure. The other well known type of double-leafed hinged air bag lid has an upper lid and a lower lid which are formed completely separately.

The first kind of double-leafed hinged air bag lid has at least one potential problem. Specifically, the first kind of double-leafed hinged air bag lid, during opening, may not rupture the outer cover skin which covers the surface of the air bag lid completely, and there exists the disadvantage that fragments of the ruptured outer cover skin will fly apart into the passenger compartment of the vehicle. The second kind of air bag lid does not have such a disadvantage and, therefore, is considered to have greater practical utility.

In this kind of completely separated or divided double-leafed hinged air bag lid, the upper end portion of the upper lid and the lower end portion of the lower lid are typically hinged to the instrument panel structure, and the lower end of the upper lid and the upper end of the lower lid are not usually connected to each other.

If the completely divided, double-leafed hinged air bag lid is mounted on a part of the vehicle body, with the lower end of the upper lid and the upper end of the lower lid positively disconnected, it is difficult to place these upper and lower lids accurately in their desired relative positions. For example, with the completely divided, double-leafed hinged air bag lid assembled to or installed in the vehicle body, facing end portions of the upper lid and the lower lid, and adjacent portions of each of these lids and the margins of the instrument panel around the opening, have a difference in level, or a gap difference, between their flat surfaces. In other words, the clearance left between the lids is not uniform in dimension. Such a dimensional nonuniformity in the clearance between the instrument panel and the air bag lid impairs the external appearance of the air bag device.

Furthermore, when the air bag is considered from a structural viewpoint, the rigidity of a hinge structure of the joined portion between the upper and lower lids is low, and there is a chance that the inside of the instrument panel structure, where the air bag device is installed from outside vehicle interior, and the region within the air bag cover, can be accessed through the clearance between the joined portions. For example, while the air bag device is covered, the air bag lid may be intentionally opened by, for example, inserting a foreign body, such as a steel wire or the like, through the clearance, and pulling the same. In some such cases, the air bag contained inside the instrument panel structure might be damaged.

SUMMARY OF THE INVENTION

The present invention has as a primary object to provide a completely divided type of air bag lid for an automotive vehicle, which has a pleasing external appearance.

It is another object of the present invention to provide an air bag device which is equipped with an air bag lid which will not be unnecessarily opened.

It is still another object of the present invention to provide an air bag device which allows an air bag lid to open easily and which prevents the air bag from damage.

These objects are achieved by providing an air bag device having an air bag disposed inside an instrument panel structure with an opening through which the air bag, while inflating, projects out of the instrument panel structure when the automotive vehicle collides with another object. The air bag device has lid means mounted on the automotive vehicle for closing the opening to cover the air bag. The lid means includes upper and lower lids capable of opening upwards and downwards, respectively, to uncover the opening. The upper and lower lids are joined together to form a single lid by connecting means attached to a back of the joined upper and lower lids. The connecting means is formed with a breakable line, such as a structurally weakened groove, along which the connecting means is broken and separated, by inflation of the air bag, into two parts, so as to allow the upper and lower lids to open upwards and downwards, respectively.

An air bag module case, which contains at least the folded air bag, is disposed inside the instrument panel structure and mounted on a steering support member of the automotive vehicle. The upper and lower lids are attached to the air bag casing or module case by flexible means, such as a thin, resilient plate or thin, resilient plates arranged substantially along the full width or length of each of the upper and lower lids.

Before the air bag lid is assembled to the vehicle body, because the lower end of the upper lid and the upper end of the lower lid are mutually joined by the connecting means but have a small clearance, the relative position of gaps left between these lids and margins of the instrument panel surrounding the opening, as well as gaps between the respective lids, can be easily and desirably adjusted.

On the other hand, after the opening has been closed by the air bag lid, the rigidity of the joined portion is increased because the lower end of the upper lid and the upper end of the lower lid are firmly connected and held by the connecting means. The clearance of the joined portion between the upper lid and the lower lid is occluded from the rear side by the connecting means, and the insertion of foreign bodies into the interior of the air bag device is, therefore, not allowed. While the air bag device is unfolded due to a collision of the automobile vehicle, the connecting means is ruptured along the weakened breakable line or groove by the inflating air bag. Such rupturing permits the upper and lower lids to open, thereby allowing the unfolding air bag to easily project out of the instrument panel structure.

BRIEF DESCRIPTION OF THE DRAWINGS

The above and other objects and features of the present invention will be apparent to those skilled in the art from the following description of a preferred embodiment thereof when considered in conjunction with the appended drawings, in which.

DETAILED DESCRIPTION OF THE PREFERRED EMBODIMENT

Figure 1:
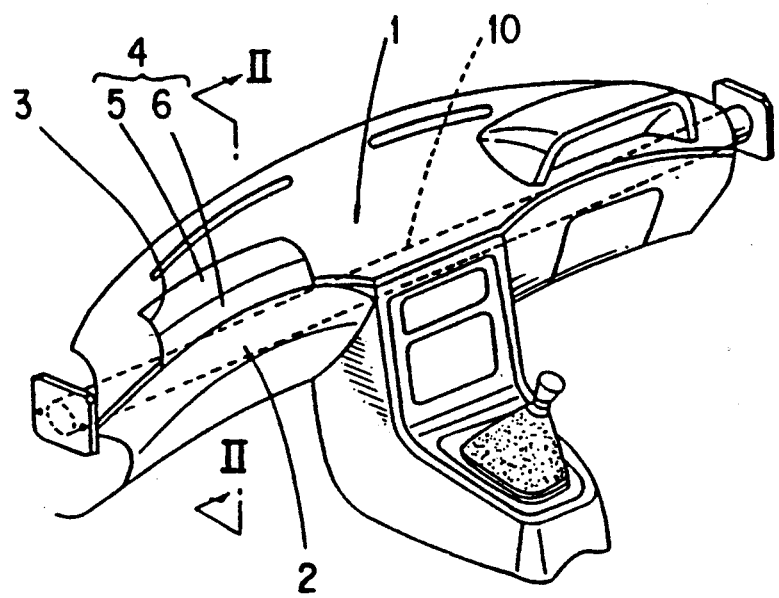
FIG. 1 is a perspective view of an essential part of an automobile equipped with an air bag device in accordance with a preferred embodiment of the present invention.

Referring to the drawings in detail and, in particular, to FIG. 1, showing a portion of an instrument panel structure 1 of an automotive vehicle equipped with an air bag device in accordance with a preferred embodiment of the present invention, the vehicle is provided with a shelf 2 projecting into the passenger compartment at a lower portion of the instrument panel structure 1 on the side of the assistant driver's seat. The shelf 2 is formed with a rectangular opening 3 of desired size at an upper position thereof. An air bag module 20, to be described in detail later, is positioned inwardly of the instrument panel opening 3. The air bag module 20 is covered by means of a two-part air bag lid 4 mounted in the instrument panel opening 3, as will be explained in detail later.

Figure 2:
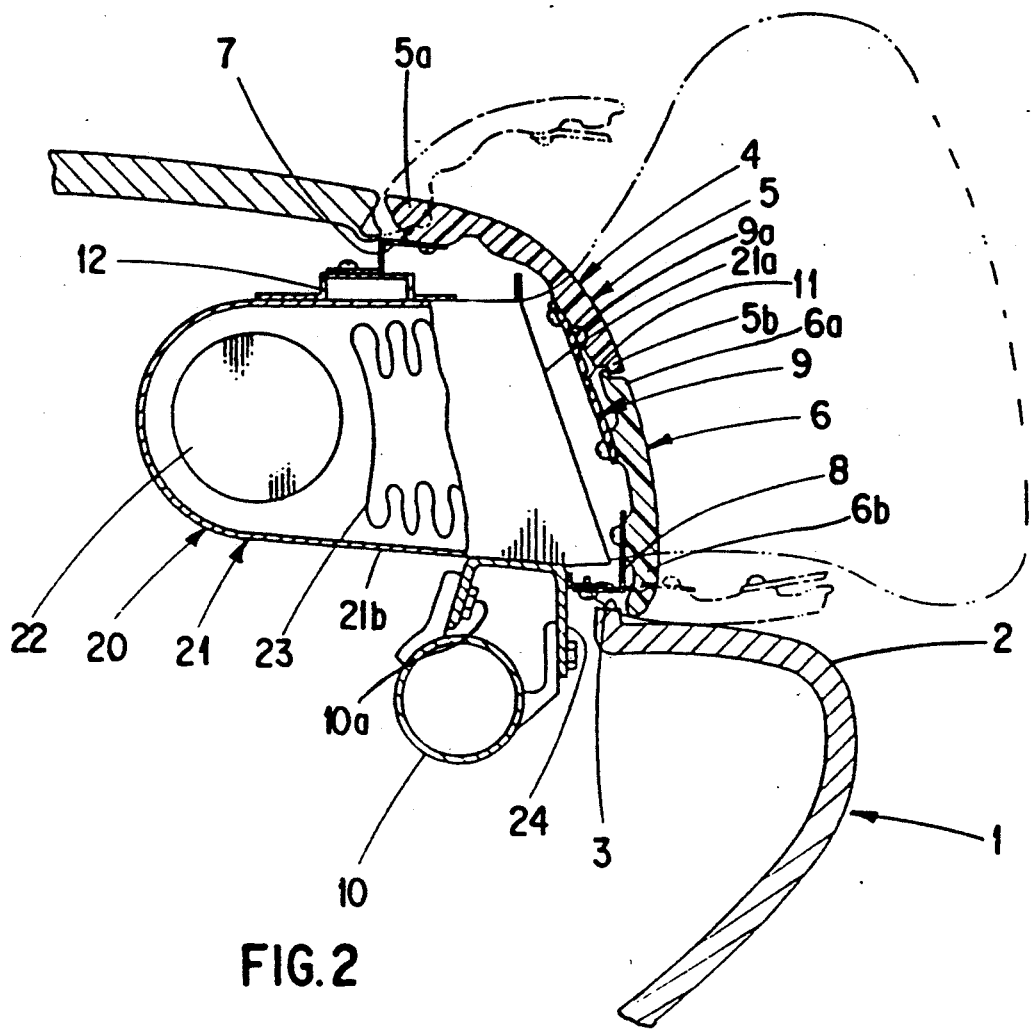
FIG. 2 is a longitudinal sectional view as seen along line II—II of FIG. 1.

Referring to FIGS. 1 and 2, it can be seen that the instrument panel opening 3 is formed in a curved portion of the instrument panel structure 1 directly above the shelf 2, and the air bag module 20 is positioned behind the instrument panel opening 3, i.e., in a position towards the front of the vehicle.

The air bag module 20, accommodated within a module case 21 which is open at forward end 21a, is constituted by an inflator 22 for generating ga and an air bag 23 capable of being unfolding by the gas. The module case 21 is positioned with the front end 21a facing through the instrument panel opening 3 towards the passenger compartment. The air bag module 20 thus constituted is disposed on the inside of the instrument panel structure 1, in a transverse direction of the vehicle, at a position somewhat below the instrument panel opening 3. The air bag module is mounted on the vehicle body by means of a bracket 24 attached to a lower wall 21b of the module case 21 and secured to a steering support member 10 by fitting the bracket 24 to the steering support member 10 by set screws 10a.

Figure 3:
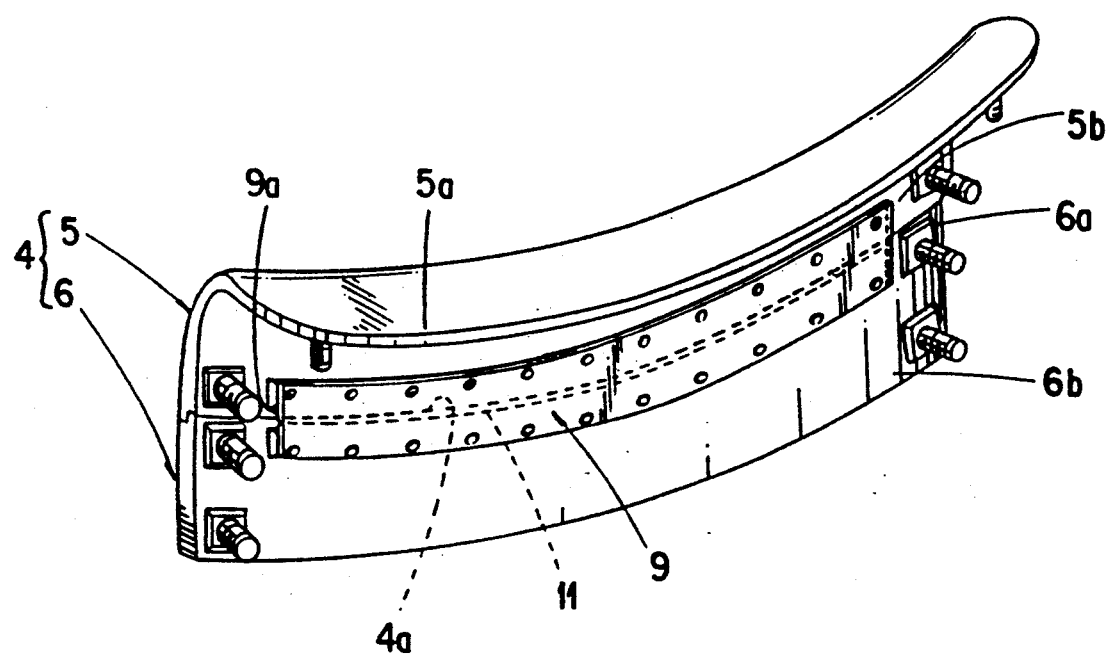
FIG. 3 is a perspective rear view of an air bag lid shown in FIG. 2.

As shown in FIGS. 2 and 3, the air bag lid 4, of a two-part or double-leafed hinged type, has an upper lid 5, which closes an upper half of the instrument panel opening 3, and a lower lid 6, which closes a lower half of the instrument panel opening 3. Each lid 5 or 6 is formed of material which is soft as compared to the instrument panel structure 1. These two lids 5 and 6 are hinged to the instrument panel structure 1, with the lower end 5b of the upper lid 5 and the upper end 6a of the lower lid 6 in mutual abutment against each other so as to form the two-part air bag lid 4 as a single curved plate. An integrally formed, band-shaped connecting member 9 is arranged to connect the abutting end portions 5b and 6a of the respective lids 5 and 6. The band-shaped connecting member 9 is formed with a thin groove 11 in that surface 9a of the connecting member 9 on the side of the air bag lid 4. This thin groove 11 extends in a lengthwise direction of the connecting member 9, and is coextensive with a parting line 4a of the two-part air bag lid 4 formed between the upper and lower lids 5 and 6. The thin groove 11 forms a weakened breakable line.

The two-part air bag lid 4, formed by the upper and lower lids 5 and 6 and connected by the connecting member 9 in such a manner, is mounted in the instrument panel opening 3 of the instrument panel structure 1. That is, the upper lid 5 is secured to a bracket 12, which is fixedly mounted on the module case 21 of the air bag module 20. The upper end portion 5a of the upper lid 5 is hinged by an upper hinge member 7, made of a thin resilient plate, having upper and lower end margins which are bent in opposite directions. Similarly, the lower lid 6 is secured to the bracket 24 with its lower end portion 6b hinged by a lower hinge member 8, made of a thin resilient plate bent in approximately an L-shape.

When covering the instrument panel opening 3 with the air bag lid 4 constructed as described above, and more particularly, when mounting the air bag lid 4 in the instrument panel opening 3 of the air bag lid 4, because the upper lid 5 and the lower lid 6 are connected together by the band-shaped connecting member 9, they can be mounted together, as an integral one piece lid unit, in the instrument panel opening 3. In other words, the upper lid 5 and the lower lid 6 can be mounted in the instrument panel opening 3 while being held in their correct relative positions. Because of this, a clearance provided between the air bag lid 4 and the instrument panel opening 3 can be easily and positively adjusted, as desired, as can a clearance left between the facing ends 5b and 6a of the respective lids 5 and 6. Accordingly, the outward appearance of the two-part air bag lid 4 and of that portion of the instrument panel structure 1 surrounding the air bag lid 4 is improved.

This contributes to increasing the commercial value of the automobile.

When the air bag 4 has been mounted in the instrument panel opening 3, because the facing portions, i.e., the lower end portion 5b and the upper end portion 6a of the upper and lower lids 5 and 6 of the two-part air bag lid 4, are mutually connected together by the connecting member 9, the air bag lid 4 is supported more rigidly as compared to such structures as in the prior art, in which facing end portions have not been mutually connected before installation. Since the connecting member 9 is disposed on the back side of the air bag lid 4, if, for example, an attempt is made to insert a wire or other foreign body into the interior of the air bag module case 21 through the clearance between the respective lids 5 and 6, such insertion is prevented by the connecting member 9. Therefore, if a foreign body is mischievously inserted through the clearance the respective lids 5 and 6 in order to try to open the air bag lid 4, the air bag lid cannot be opened. In addition, a foreign body can not damage the air bag 23 within the module case 21, and, therefore, an increase in reliability of the air bag device itself is provided.

In operation of the air bag device, upon a collision of the automobile with another object, the inflator 22 first receives a signal from a collision sensor (well known in the art and not shown in the drawings), and is actuated thereby to generate gas. The air bag 23 then inflates and unfolds due to the pressure of the gas supplied thereto. As the air bag 23 unfolds, the two-part air bag lid 4 receives pressure from the air bag 23 on its inner side towards the vehicle interior, causing the connecting member 9 to rupture along the breakable line 11. The rupture of the connecting member 9 releases the restraint of the upper lid 5 and the lower lid 6 so that as soon as the connecting member 9 ruptures, the upper lid 5 and the lower lid 6 are pushed to open upwards and downwards about their hinges 7 and 8, respectively, by and during the expansion of the air bag 23, as shown by a chained line in FIG. 2. The upper and lower lids are pushed into the passenger compartment, thereby allowing the air bag 23 to be completely expanded for restraining the occupant in the passenger compartment. At this time, since the lower lid 6, as shown by the chained line in FIG. 2, opens so as to extend along the shelf 2, with its upper end 6a located under the air bag module 20 and on an opposite side of the air bag from the passenger in the passenger compartment, i.e., away from the top of the completely expanded air bag 23, the occupant, thrown forward during the collision, is prevented from striking directly against the upper end 6a of the opened lower cover 6.

Each of the upper and lower hinge members 7 and 8 are resilient and bendable so as to allow the upper and lower lids to open upwards and downwards, respectively. Since, as shown in FIGS. 1 and 3, the instrument panel structure 1 is greatly curved in the transverse direction so as to extend forward at its central portion, each of the hinges 7 and 8, if formed by a single plate, might be difficult to flexurally deform. In such a case, each hinge 7 or 8 may be divided into a plurality of hinge portions and positioned so as to bend toward the direction of curvature of the instrument panel structure 1.

It is to be understood that although the invention has been described in detail with respect to a preferred embodiment thereof, nevertheless, various other embodiments and variants are possible which are within the spirit and scope of the invention, and such other embodiments and variants are intended to be covered by the following claims.

What is claimed is:

1. An air bag device for an automotive vehicle, having at least an air bag disposed inside an instrument panel structure with an opening through which the air bag, while inflating, projects upon a collision of the automotive vehicle, said air bag device comprising:

lid means for covering the opening, said lid means including an upper lid and a lower lid, separate at all times from the upper lid, said upper lid capable of opening upwards and said lower lid capable of opening downwards to uncover the opening; and a band-shaped connecting member attached to both a back of said upper lid and a back of said lower lid for joining said upper and lower lids together to form a single two-part lid, said connecting member being formed with a breakable line along which said connecting member is broken and separated, by inflation of the air bag, into two parts so as to allow said upper and lower lids to open.

2. An air bag device as defined in claim 1, and further comprising a module case disposed inside said instrument panel structure and containing therein the air bag, when uninflated and folded, said module case being mounted on a steering support member of the automotive vehicle.

3. An air bag device as defined in claim 2, wherein each of said upper and lower lids is attached to said module case at least partially by flexible means.

4. An air bag device as defined in claim 3, wherein said flexible means comprises a thin, resilient plate extending substantially along a full width of each of said upper and lower lids.

5. An air bag device as defined in claim 3, wherein said flexible means comprises a plurality of thin, resilient plates arranged side by side and extending substantially along a full width of each of said upper and lower lids.

6. An air bag device as defined in claim 1, wherein said breakable line is formed substantially coextensively with a small gap between said upper and lower lids.

7. An air bag device as defined in claim 1, wherein said breakable line comprises a groove formed in said connecting member.

8. An air bag device as defined in claim 1, wherein said air bag is located inside a portion of the instrument panel structure in front of a passenger seat of the automotive vehicle.

9. An air bag device as defined in claim 1, wherein the upper lid has a lower end which abuts and at least partially overlaps an upper end of the lower lid of the lid means.

* * * * *